(12) United States Patent
Tada et al.

(10) Patent No.: US 8,709,193 B2
(45) Date of Patent: Apr. 29, 2014

(54) METHOD OF MANUFACTURING ADHESIVE-FREE LAMINATE OF ARAMID PAPER AND POLYPHENYLENE SULFIDE FILM, AND INSULATION MATERIAL AND INSULATION STRUCTURE FOR ROTATING ELECTRIC MACHINERY

(75) Inventors: Kenichirou Tada, Ibaraki (JP); Satoru Nakanishi, Ibaraki (JP); Taku Yamaga, Ibaraki (JP); Shun Ito, Ibaraki (JP); Kenichi Watanabe, Ibaraki (JP); Miyoshi Yokura, Mie (JP); Masashi Kato, Mie (JP); Hisashi Katsumata, Mie (JP)

(73) Assignees: Hitachi Engineering & Services Co., Ltd., Ibaraki (JP); Kawamura Sangyo Co., Ltd., Mie (JP)

( * ) Notice: Subject to any disclaimer, the term of this patent is extended or adjusted under 35 U.S.C. 154(b) by 1036 days.

(21) Appl. No.: 12/511,180

(22) Filed: Jul. 29, 2009

(65) Prior Publication Data

US 2010/0062206 A1 Mar. 11, 2010

(30) Foreign Application Priority Data

Jul. 30, 2008 (JP) ................. 2008-196704

(51) Int. Cl.
*B32B 37/00* (2006.01)
(52) U.S. Cl.
USPC ..................................... 156/272.2
(58) Field of Classification Search
USPC ........................... 156/272.2, 272.6
See application file for complete search history.

(56) References Cited

U.S. PATENT DOCUMENTS

| 3,949,455 | A | * | 4/1976 | Biondetti ................... 492/2 |
| 4,481,060 | A | | 11/1984 | Hayes |
| 4,698,267 | A | | 10/1987 | Tokarsky |
| 4,729,921 | A | | 3/1988 | Tokarsky |
| 4,815,183 | A | | 3/1989 | Bondetti |
| 4,858,292 | A | | 8/1989 | Buhlmann et al. |
| 5,026,456 | A | | 6/1991 | Hesler et al. |

(Continued)

FOREIGN PATENT DOCUMENTS

| DE | 41 21 547 A1 | 1/1993 |
| EP | 0 440 502 A1 | 8/1991 |

(Continued)

OTHER PUBLICATIONS

EP Search Report of Appln. No. 09009793.2 dated Nov. 20, 2009 in English.

(Continued)

*Primary Examiner* — Daniel McNally
(74) *Attorney, Agent, or Firm* — Antonelli, Terry, Stout & Kraus, LLP.

(57) ABSTRACT

A low-temperature plasma treatment is applied to a surface of an aramid paper so as to allow the surface to have a compositional atomic ratio X (O/C) of the number of oxygen atoms (O) to the number of carbon atoms (C) ranging from 110% to 220% of a theoretical atomic ratio. The treatment is performed at an intensity ranging from 120 to 1500 W·min/m² with a low-temperature plasma treatment apparatus of internal electrode system. The aramid paper is superposed with a nonhydrolyzable resin film and the resulting article is pressurized to give an aramid-resin film laminate. The laminate is inexpensive, has both superior electrical properties and high mechanical strength, excels in elasticity, and is useful as an insulation material.

11 Claims, 4 Drawing Sheets

(56) References Cited

U.S. PATENT DOCUMENTS

| | | | |
|---|---|---|---|
| 5,124,173 | A | 6/1992 | Uchiyama et al. |
| 5,259,306 | A | 11/1993 | Jenkins et al. |
| 5,316,834 | A * | 5/1994 | Matsuda et al. ............ 442/247 |
| 5,380,180 | A | 1/1995 | Lamb, Sr. |
| 5,543,017 | A | 8/1996 | Uchiyama et al. |
| 5,895,547 | A | 4/1999 | Kathrein et al. |
| 6,929,848 | B2 | 8/2005 | Samuels et al. |
| 7,335,276 | B2 | 2/2008 | Kawka et al. |
| 7,341,792 | B2 | 3/2008 | Zinbo et al. |
| 7,927,461 | B2 * | 4/2011 | Yokura et al. ............... 162/192 |
| 7,967,941 | B2 * | 6/2011 | Nakanishi et al. ........... 156/299 |
| 2004/0071952 | A1 | 4/2004 | Anderson et al. |
| 2004/0072000 | A1 | 4/2004 | Kawka et al. |
| 2008/0000599 | A1 * | 1/2008 | Yokura et al. ................ 162/146 |
| 2008/0182098 | A1 * | 7/2008 | Nakanishi et al. ........... 428/326 |
| 2009/0258207 | A1 | 10/2009 | Miyaji et al. |

FOREIGN PATENT DOCUMENTS

| | | |
|---|---|---|
| EP | 1 249 340 | 10/2002 |
| EP | 1 873 307 | 1/2008 |
| EP | 1 958 766 A1 | 8/2008 |
| GB | 2 053 026 | 2/1981 |
| JP | 60-63158 | 4/1985 |
| JP | 63-139707 | 6/1988 |
| JP | 2-49035 | 2/1990 |
| JP | 5-58263 | 8/1993 |
| JP | 6-256733 | 9/1994 |
| JP | 06-305089 | 11/1994 |
| JP | 07-32549 | 2/1995 |
| JP | 07-299891 | 11/1995 |
| JP | 08-99389 | 4/1996 |
| JP | 09-169055 A | 6/1997 |
| JP | 11-209484 | 8/1999 |
| JP | 2003-246018 | 9/2003 |
| JP | 2008-007875 | 1/2008 |
| JP | 2009-138312 | 6/2009 |
| WO | WO 93/00686 | 1/1993 |
| WO | WO 2004/031466 | 4/2004 |
| WO | WO 2007/060929 | 5/2007 |

OTHER PUBLICATIONS

JP Office Action of Appln. No. 2009-248098 dated Dec. 6, 2011 with partial English translation.

JP Office Action of Application No. 2008-196704 dated May 12, 2009.

* cited by examiner

METHOD OF MANUFACTURING ADHESIVE-FREE LAMINATE OF ARAMID PAPER AND POLYPHENYLENE SULFIDE FILM, AND INSULATION MATERIAL AND INSULATION STRUCTURE FOR ROTATING ELECTRIC MACHINERY

CLAIM OF PRIORITY

This patent application claims priority from Japanese Patent Application No. 2008-196704 filed on Jul. 30, 2008, the entire contents of which are incorporated herein by reference.

FIELD OF THE INVENTION

The present invention relates to an aramid paper which excels in mechanical properties, heat resistance, electrical insulation, and chemical resistance, the aramid paper being used as an electrical insulating sheet (paper) typically in transformers, electric motors, and electric generators, and relates to a method of manufacturing of the aramid paper and further relates to a laminate of an aramid paper and a resin film.

BACKGROUND OF THE INVENTION

Heat-resistant synthetic insulating paper called as "aramid paper" has recently been provided as an electrical insulating material. More specifically, for example, aromatic polyamide paper is known under the trademark of Nomex (registered trademark) owned by E.I. du Pont de Nemours and Company, U.S.A. (hereinafter, DuPont), such as Nomex #410 and #411. This aromatic polyamide paper has excellent heat resistance, high mechanical properties, and satisfactory electrical insulation and has a thickness ranging from 2 to 20 milli-inch (mil). This aramid paper is used as an insulating material for transformers, electric motors and electric generators all of which are needed to have high heat resistance belonging to type H (180° C.) in a heat resistance division of International Electrotechnical Commission (IEC) 85 (1984).

The aramid paper is made mainly from pulp-like aramid (aromatic polyamide) fibrids and heat-resistant aramid short fibers by a wet papermaking process similar to a method of making Japanese paper as WASHI. If necessary, the aramid paper is heated and pressurized (calendered) to be commercially available. The Nomex® #410 is a calendered product, whereas the Nomex® #411 is a non-calendered product. Each of these aramid papers contains a number of voids therein as normal paper does. Accordingly, the aramid papers necessarily have a lower breakdown voltage (BDV: in KV/mm) per thickness than that of a film having the equivalent quality and same thickness.

In contrast, a film of polyester (hereinafter, referred to as "PET film") such as polyethylene terephthalate or polyethylene naphthalate has a lower resistance to heat than the aramid paper and is classified into a type E (120° C.) in the heat resistance division of IEC 85 (1984). However, the PET film has a higher breakdown voltage and is more inexpensive. The PET film is thereby used in a wide range for the purpose of insulation corresponding to the type E or lower types.

Incidentally, insulating materials belonging to the type F (155° C.) have recently been desired in a market. The insulating materials of the type F do not require so high heat resistance equivalent to those of type H. Aramid papers have no problem in their heat resistance if used in type F but they are expensive. As a result, development of more inexpensive materials has been desired. The following materials (a) to (e) have been proposed as cost-effective type F materials:

(a) A multilayer structure of an aramid paper and a PET film together through an adhesive, in which the aramid paper has high resistance to heat and to oxidation, and the PET film has high electrical insulation;

(b) An aramid laminate prepared by layering an aramid paper and a PET film on each other and pressurizing and heating the laid aramid paper and PET film under the conditions of temperature ranging from 220° C. to 250° C. and linear pressure of 50 kg/cm or more so that the laid aramid paper and PET film are laminated by thermal bonding to give a laminate (see, for example, Patent Document 1: JP-A No. H07-32549 (1995)) . The used aramid paper is m-aramid paper, whereas the used PET film is a biaxially oriented PET film;

(c) A laminate including in order an aramid paper layer (layer A), a PET layer, and a PET film layer, wherein the PET layer is formed by heat melt bonding to or impregnating into a surface of the layer A at a temperature equal to or higher than the melting point of PET. The laminate is prepared by the following processes: layering the PET layer and the PET film on the surface of the layer A in the order these terms appeared, subsequently melt bonding between the PET layer and the PET film at a roll temperature of 220° C. to 250° C. and a pressure of 50 kg/cm or more, and rapidly cooling them at a rate of 100° C./minute or more (see, for example, Patent Document 2: JP-A No. H07-299891 (1995);

(d) A laminate prepared by layering an m-aramid paper having a specific gas permeability and a polyester film having an intrinsic viscosity of 0.6 or more, calendering the m-aramid paper and the polyester film with two calendering rolls maintained at elevated temperatures which differ from each other, specifically a surface of the m-aramid paper layer side roll has a higher roll temperature and a surface of the polyester film layer side roll has a lower roll temperature, after calendaring, and cooling rapidly the two layers at temperature equal to or lower than the glass transition point of the polyester; thereby, the laminate being formed so that the two layers firmly bonded to each other by impregnating only a surface layer of the m-aramid paper layer between the two layers with a molten polyester (see, for example, Patent Document 3: JP-A No. H08-99389 (1996)); and (e) A prepreg prepared by subjecting a nonwoven fabric made from aramid fibers to a plasma treatment under normal atmospheric pressure, impregnating the treated nonwoven fabric with a thermosetting resin, and heating the impregnated nonwoven fabric to be in a "B-stage" (see, for example, Patent Document 4: JP-A No. H11-209484 (1999)).

The multilayer structure of (a) in which the aramid paper and the PET film are bonded to each other through the adhesive is poor in workability such as bending workability, because the adhesive is relatively hard and this impairs excellent elasticity originated from the material aramid paper and PET film. Furthermore, when the multilayer structure is applied to oil-immersed equipment, components of the adhesive may migrate into the oil, whereby the usage of the multilayer structure is limited. The prepreg of (e) is prepared by impregnating the nonwoven fabric made from aramid fibers with a thermosetting resin. This prepreg also uses the thermosetting resin as an adhesive.

On the other hand, in the aramid laminate of (b) and the laminate of (c), the aramid paper and the PET film are bonded together by heat melt bonding without use of an adhesive, so that the defect resulting from use of adhesive can be overcome. In the aramid laminate of (b), however, since the temperature of heat melt bonding is approximate to a melting point of PET (about 260° C.), variations in the dimensions of PET film are increased. This results in warpage, shrinkage or crease in the bonded products. Furthermore, the PET tends to be crystallized partially. As a result, it is difficult to give products with stable quality. Since the temperature of heat melt bonding is high in the above laminate of (c), too, part of PET impregnated in the aramid paper is crystallized and thereby damage the excellent elasticity.

In the laminate of (d), the polyester is melted, and the aramid fibers or aramid paper is impregnated with the molten polyester. In order to melt the polyester, the polyester must be heated at a temperature higher than its melting temperature. Accordingly, the polyester re-crystallizes upon cooling to decrease its elasticity.

Under these circumstances, an object of the present invention is to provide an aramid paper, and a manufacturing method thereof, which aramid paper is thermally bondable with a nonhydrolyzable resin film such as a polyphenylene sulfide (hereinafter briefly referred to as "PPS") film at a relatively low temperature without using an adhesive and which has high heat resistance. Another object of the present invention is to provide a laminate of an aramid paper and a resin film, the laminate which has both high heat resistance derived from the constituent aramid paper and satisfactory electrical insulation derived from the constituent nonhydrolyzable resin film and which excels in elasticity.

SUMMARY OF THE INVENTION

Inventors of the present invention made considerable research and study in order to accomplish the objects, that is, to obtain an aramid paper thermally bondable at a relatively lower temperature without using adhesives. Consequently, although it had been believed to be impossible to thermally bond an aramid paper at a low temperature of 200° C. or lower because of high melting temperature of the aramid of about 320° C., the present inventors surprisingly found that an aramid paper is thermally bondable at a low temperature without using an adhesive, by applying a low-temperature plasma treatment to a surface of the aramid paper for the purpose of surface modification. The present invention has been made based on these findings.

Specifically, according to an embodiment of the present invention, there is provided an aramid paper made mainly from fibrids and short fibers of an aramid and formed into a paper. A surface of the aramid paper has been subjected to a low-temperature plasma treatment so as to be thermally bondable directly with a nonhydrolyzable resin film (the invention of Claim 1).

The reason that the surface of the aramid paper is thermally bondable directly with a nonhydrolyzable resin film, is probably because the low-temperature plasma treatment applied to the surface of the aramid paper helps to introduce oxygen atoms into the surface; as a result, COOH groups and OH groups are added to the surface of the aramid paper, thus enabling thermal adhesion between aramid papers or between the aramid paper and nonhydrolyzable resin film.

As used herein the term "aramid paper" refers to a paper made mainly from fibrids and short or discontinuous fibers of a poly-m-phenyleneisophthalamide, a copolymer thereof, or a mixture of copolymers thereof, by papermaking. No particular limitation should be provided regarding the copolymer of poly-m-phenyleneisophthalamide, component to be mixed with poly-m-phenyleneisophthalamide or blending quantity unless the properties of m-aramid are spoiled. Exemplary components to be blended include terephthalic acid, p-phenylenediamine, hexamethylenediamine, and cyclohexamethylenediamine. The m-aramid may further contain inorganic salts, additives, and fillers, if necessary. Nomex® (trademark owned by DuPont, U.S.A.) and Teijincomex® (trademark owned by Teijin Limited, Japan) are commercially available currently.

As used herein, the term "low-temperature plasma treatment" refers to a treatment in which a DC or AC high voltage is applied between electrodes so that a base material to be treated is exposed to discharge such as a corona discharge under atmospheric pressure or a glow discharge in a vacuum. The treatment is preferably, but not limitatively, performed in a vacuum, because such a treatment in a vacuum has a broader selection range of a treatment gas. Though not especially limited, exemplary treatment gases include helium (He), neon (Ne), argon (Ar), nitrogen (N), oxygen (O), carbon dioxide gas, air, and water vapor. Each of different treatment gases may be used alone or in combination. Among them, argon or carbon dioxide gas is preferred from the viewpoint of the discharge starting efficiency. A low-temperature plasma treatment such as a glow discharge treatment is preferred from the viewpoint of a treating efficiency. In the glow discharge treatment, discharge is continued at a pressure ranging preferably from 0.1 Pa to 1330 Pa and more preferably from 1 Pa to 266 Pa.

The aramid paper may be thermally bondable directly with the nonhydrolyzable resin film at a temperature ranging from 100° C. to 200° C. at a thermal bonding pressure in terms of contact pressure of, for example, 50 kgf/cm$^2$ to 150 kgf/cm$^2$ (the invention of Claim 2). The plasma treatment applied to the surface of the aramid paper enables more secure thermal bonding with the nonhydrolyzable resin film at an extremely low temperature of 100° C. or higher and 200° C. or lower.

Another embodiment of the present invention as mentioned below enables bonding between an aramid paper and a polyphenylene sulfide film even at a further higher thermal bonding pressure in terms of contact pressure than the above-specified contact pressure range.

Specifically, there is provided a method for manufacturing an electrical insulation laminate (adhesive-free aramid-polyphenylene sulfide (PPS) laminate) which method can be performed at a low temperature but under a high pressure. This method is a method for manufacturing a laminate of an aramid and a poly(phenylene sulfide) without using an adhesive, which includes the steps of: laminating and bonding the plasma surface treated aramid paper made from an aramid fiber and an aramid pulp with the plasma surface treated polyphenylene sulfide film at a roll temperature of 30° C. or higher but lower than 50° C. under a linear load of 500 kgf/cm or higher with a pair of press rolls, or at a roll temperature of 50° C. or higher but lower than 100° C. under a linear load of 200 kgf/cm or higher with a pair of press rolls (the invention of Claim 9).

The nonhydrolyzable resin film for use herein is preferably a polyphenylene sulfide (hereinafter, referred to as "PPS") film. PPS does not invite hydrolysis and is highly resistant to heat. The reasons for selecting PPS is as follows. An aramid paper is immersed in insulating oil when it is used as an insulation material typically for electric motors of hybrid vehicles and for transformers of railway vehicles. In this case, the insulating oil contains a trace amount of water, and this may cause hydrolysis of a resin film bonded to the aramid paper in high-temperature environments. The resin film, if of some type, may be hydrolyzed to invite dielectric breakdown when the aramid paper with the resin film is used over a long period of time typically in electric motors of hybrid vehicles and for transformers of railway vehicles. The use of PPS as a nonhydrolyzable resin film provides both high resistance to heat and satisfactory resistance to hydrolysis. This enables the resulting laminate to maintain stable insulation properties over a long period of time even in a severe environment.

According to another preferred embodiment, the thermal bonding face of the aramid paper has a compositional atomic ratio X (O/C) of the number of oxygen atoms (O) to the number of carbon atoms (C) ranging from 110% to 250% of a theoretical atomic ratio (the invention of Claim 4). This gives desired thermal adhesiveness. As used herein the term "compositional atomic ratio X (O/C)" refers to a ratio of the measured number of oxygen atoms (O) to the measured number of carbon atoms (C) as measured on the surface of the aramid paper through X-ray photoelectron spectroscopy (XPS). The term "theoretical atomic ratio" refers to an atomic ratio as calculated based on repeating units in the chemical structural formula of the resin composition constituting the resin.

For example, a resin of "Nomex® #411" (supplied by DuPont, U.S.A.) type is a poly-m-phenyleneisophthalamide, the compositional ratio among carbon, oxygen, and nitrogen (C/O/N) is 14/2/2, and a theoretical atomic ratio (a theoretical value of the atomic ratio X (O/C)) of the number of oxygen atoms (O) to the number of carbon atoms (C) is obtained as 2/14=0.143 on the basis of carbon (C). A measured value is usually supposed to be smaller than the theoretical value since a trace amount of hydrocarbon compounds is adherent on the surface.

The research made by inventors of the present invention shows that desired thermal adhesiveness is obtained when the compositional atomic ratio X (O/C) ranges from 110% to 250% of the theoretical value, that is, is larger than the theoretical atomic ratio by 10% to 150%. The compositional atomic ratio more preferably ranges from 150% to 230%. Satisfactory thermal adhesiveness may not be obtained if the compositional atomic ratio X is below 110% of the theoretical value and above 250% of the theoretical value.

The aramid paper may be prepared, for example, by a method which includes the steps of preparing an aramid paper in the form of a paper mainly from fibrids and short fibers of an aramid; and applying a low-temperature plasma treatment to at least one surface of the aramid paper with a low-temperature plasma treatment apparatus (the invention of Claim 5). The aramid paper manufactured by the method is thermally bondable directly with a nonhydrolyzable resin film.

The low-temperature plasma treatment apparatus is preferably of internal electrode system, and the low-temperature plasma treatment is preferably performed at an intensity (output) ranging from 30 W·min/m$^2$ to 1500 W·min/m$^2$. This enables the compositional atomic ratio X (O/C) to be within the above-specified range. The research made by inventors of the present invention shows that the compositional atomic ratio X (O/C) may be smaller when the intensity of the low-temperature plasma treatment is lower than the above-mentioned range, and that the compositional atomic ratio X (O/C) may be larger when the intensity of the low-temperature plasma treatment is higher than the above-mentioned range. Desirable thermal adhesiveness may not be obtained in each case. The intensity of the low-temperature plasma treatment more preferably ranges from 130 W·min/m$^2$ to 1200 W·min/m$^2$.

The present invention is further characterized in that the above-mentioned aramid paper subjected to the plasma treatment is thermally bonded directly with at least one side of the nonhydrolyzable resin film (the invention of Claim 7). The aramid paper exhibits thermal adhesiveness at temperatures sufficiently lower than the melting point of the nonhydrolyzable resin film and is thermally bondable directly with the nonhydrolyzable resin film without using an adhesive. The resulting laminate between the aramid paper and the resin film is of high quality and is inexpensive.

The aramid-resin film laminate according to the present invention is usable as an electrical insulation material that exhibits high performance. The laminate is preferably usable as an insulation material typically in transformers, electric motors, and electric generators. It is especially preferably usable as insulation material typically in electric motors of hybrid vehicles that require excellent heat resistance and satisfactory resistance to hydrolysis. The thickness of the nonhydrolyzable resin film is not critical and may be suitably set depending on the purpose and end use of the laminate.

In another embodiment of the present invention, there is provided an electrical insulation material as follows.

The electric rotating machine-use insulation material is to be inserted in each slot of an iron core of an electric rotating machine and has a wedge-shaped cross section. The wedge-shaped insulation material comprises an adhesive-free laminate of an aramid paper and a polyphenylene sulfide film, the aramid paper made from aramid fibers and aramid pulp, the aramid paper and the polyphenylen sulfide film having been subjected to plasma surface treatment, the laminate having a three-layered structure of the aramid paper, the polyphenylen sulfide film, and another ply of the aramid paper in this order or having a two-layered structure of the aramid paper and the polyphenylen sulfide film, the layered structure with adhesive-free non-melting compression bonding.

As used herein the term "nonhydrolyzable resin film" refers to a film of a resin that does not suffer from hydrolysis, and a representative example thereof is a polyphenylene sulfide (PPS).

The nonhydrolyzable resin film has preferably been subjected to a treatment for the improvement of adhesiveness, for more satisfactory adhesiveness with the aramid paper. The research made by inventors of the present invention demonstrates that at least one side of the nonhydrolyzable resin film before thermal bonding preferably has a compositional atomic ratio X (O/C) of the number of oxygen atoms (O) to the number of carbon atoms (C) ranging from 102.5% to 110% of a theoretical atomic ratio.

Exemplary techniques for improvement of the nonhydrolyzable resin film surface include a corona treatment and a low-temperature plasma treatment. The treatment intensity (output) in the low-temperature plasma treatment can be selected according to the type of nonhydrolyzable resin film, the type and performance of the treating apparatus. The apparatus, electrodes, and other conditions for the low-temperature treatment are not limited but may be those well known in the art.

The technique for thermally bonding the aramid paper directly with the nonhydrolyzable resin film without using an adhesive to give the aramid-resin film laminate is not limited to the above-described manner. For example, one of known procedures such as hot press, hot roller, hot air, and ultrasonic wave may be selected according to a purpose of the laminate. In this case, the bonding is preferably performed at a temperature which is as low as possible and is equal to or lower than the melting point of the nonhydrolyzable resin film. Consequently, the nonhydrolyzable resin film can be prevented typically from deterioration, and this gives a high-quality laminate.

Exemplary combinations of the aramid paper and the nonhydrolyzable resin film in the aramid-resin film laminate include patterns of A/A, A/B/A, B/A/B, and A/A/B/A, in which symbol A refers to the aramid paper and symbol B refers to the nonhydrolyzable resin film.

The aramid paper and the method for manufacturing the same, according to embodiments of the present invention, enable thermal bonding or low-temperature bonding of the aramid paper with a nonhydrolyzable resin film without using an adhesive. The aramid-resin film laminate according to an embodiment of the present invention has both high heat resistance derived from the aramid paper and high insulation and resistance to hydrolysis derived from the nonhydrolyzable resin film. The laminate also excels in elasticity, is relatively inexpensive, and has high quality.

The PPS resin has characteristic properties not causing the hydrolysis thereof and having excellent electrical insulation properties and heat resistance. Therefore, it is suitable for an insulation material to use in an environment having moisture. On the other, the aramid paper although trails the PPS resin in terms of the electrical insulation properties, it is superior in mechanical strength and heat resistance to the PPS film. Therefore, a realization in the laminate of the aramid paper and the PPS film although has been desired in insulation fields where the insulation material is used in severe environment, for example automobile engine room. Incidentally, it was thought that the realization is difficult in general because the PPS film is inferior in adherability of laminate plies (The PPS film has characteristic properties of peeling off easily in short time even when boding it to the different material with an adhesive). Under these circumstances, the inventors of the present invention work toward the realization of the laminate of the aramid paper and the PPS film, and after much trial and error, they could realize the epoch-making aramid-PPS lamination with excellent adhesive-free non-melting compression bonding in peel strength by the present invention needless to say the electrical insulation properties, hydrolysis resistance, mechanical strength, chemical resistance, and heat resistance.

DESCRIPTION OF THE PREFERRED EMBODIMENTS

Embodiments of the present invention will be explained with reference to several examples below and the attached drawings. Examples 1 to 5 are laminates of an aramid paper and a resin film laminates according to the present invention, as shown in Table 1 which is explained later. Each of these aramid-resin film laminate includes a nonhydrolyzable resin film and the aramid paper thermally bonded directly with one side of the nonhydrolyzable resin film without using an adhesive.

The aramid paper is made mainly from fibrids and short fibers of a poly-m-phenyleneisophthalamide (m-aramid) and formed into a paper. The aramid paper has a surface (thermal bonding face) to which a low-temperature plasma treatment has been applied such that the surface be thermally bondable directly with another sheet of aramid paper of the same material or a nonhydrolyzable resin film. The surface (thermal bonding face) of the aramid paper has a compositional atomic ratio X (O/C) of the number of oxygen atoms (O) to the number of carbon atoms (C) ranging from 110% to 250% of a theoretical atomic ratio. The number of carbon atoms (C) and the number of oxygen atoms (O) are obtained by measurement on the surface of the aramid paper through X-ray photoelectron spectroscopy (XPS). The theoretical atomic ratio refers to the value of an atomic ratio (by number) calculated based on a resin composition of the aramid paper.

Figure 1:
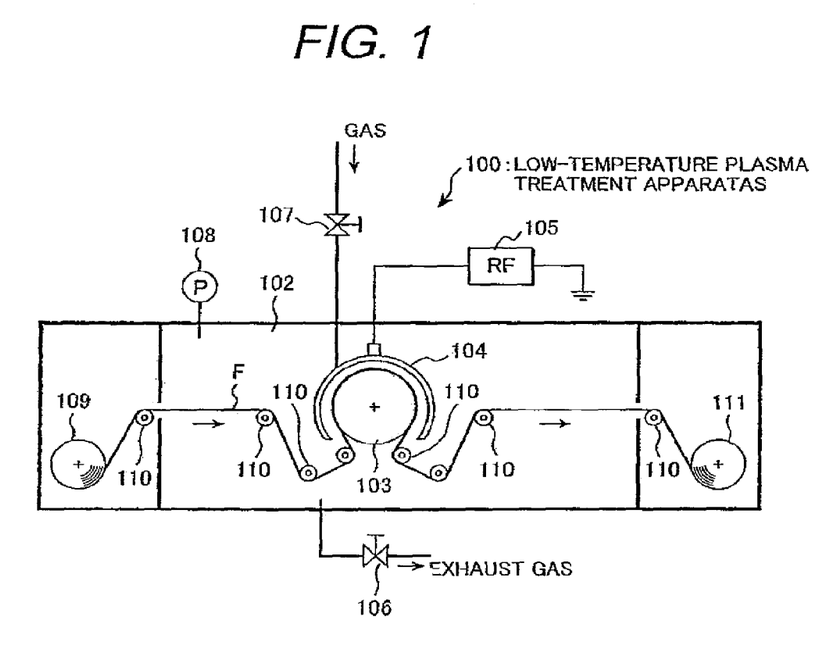
FIG. 1 is a schematic diagram of a laminating-bonding apparatus for use in a first embodiment of the present invention.

Specifically, a commercially available aramid paper (e.g., "Nomex® #411" supplied by DuPont U.S.A.) was used as the aramid paper in Examples 1 to 5. The aramid paper has a thickness of 2 mil (50 μm). The low-temperature plasma treatment was applied to a bonding side of each aramid paper by a low-temperature plasma treatment apparatus 100 of the inner electrode system while the condition (treatment intensity) was varied. The apparatus 100 will be described later. The treatment intensity ranges from 30 W·min/m² to 1500 W·min/m². More specifically, the treatment intensity is set to 50 W·min/m² in Example 1; set to 130 W·min/m² in Example 2; set to 650 W·min/m² in Example 3; set to 1120 W·min/m² in Example 4; and set to 1400 W·min/m² in Example 5.

FIG. 1 illustrates how a low-temperature plasma treatment is performed by the low-temperature plasma treatment apparatus 100. The low-temperature plasma treatment apparatus 100 includes a hermetically sealable treatment chamber 102, which comprises a roller 103 for plasma treatment. An electrode 104 is provided so as to surround the roller 103 with a slight gap being present therebetween. The electrode 104 is connected to a high-frequency power source 105, and the treatment roller 103 is grounded (not shown). A valve 106 connected to a vacuum pump (not shown) is opened so that the interior of the treatment chamber 102 is depressurized. A valve 107 connected to a gas source (not shown) so that a treatment gas such as argon or nitrogen is supplied to a treating (discharge) portion. A pressure gage 108 is provided for measuring the pressure in the treatment chamber 102.

An aramid paper F (original paper) before treatment is drawn out of a roll thereof located at a supply section 109. While guided by plural guide rollers 110 in the treatment chamber 102, the aramid paper F is wound on a take-up reel 111 nearly one turn so as to pass through the gap between the treatment roller 103 and the electrode 104. After the plasma treatment has been carried out at the gap under the electrode 104, the aramid paper F is re-wound up onto the take-up reel 111 while being guided by the guide rollers 110. The low-temperature plasma treatment is applied to both sides of the aramid paper F (or thermal bonding face alone).

As a result, the aramid papers of Examples 1, 2, 3, 4, and 5 have surface compositional atomic ratios X (O/C) of 127%, 174%, 206%, 213%, and 233%, respectively, of the theoretical atomic ratio.

A PPS resin film is used in each of Examples 1 to 5 as the nonhydrolyzable resin film to be bonded with the aramid paper.

The PPS resin film has been subjected to a surface treatment for improvement of adhesiveness too. The low-temperature plasma treatment apparatus 100 of the inner electrode system is also used for the PPS resin film so that the low-temperature treatment is carried out at 100 W·min/m². As a result, the compositional atomic ratio X (O/C) of the number of oxygen atoms (O) to the number of carbon atoms (C) of each film surface ranges from 102.5% to 110% of the theoretical atomic ratio.

The plasma-treated aramid paper (A) and PPS resin film (B) were thermally bonded directly with each other to give an aramid-PPS resin laminate. Hot press was used for the thermal bonding. The aramid paper (A) and PPS resin film (B) were superposed on each other and interposed between hot plates heated, and a pressure (20 kg/cm²) was applied to the aramid paper (A) and PPS resin film (B) for 10 minutes. Thereafter, the pressure was discharged, and the laminate is taken out and spontaneously cooled to room temperature. Thus, a sample product was obtained.

In contrast, each of Comparative Examples 1 and 2 is also an aramid-PPS resin film laminate prepared by thermally bonding an aramid paper (A) and a PPS resin film (B) directly but has different properties from those of the embodiments according to the present invention. Specifically, no low-temperature plasma treatment is applied to the aramid paper (A) in Comparative Example 1; and a low-temperature plasma treatment at an excessively high intensity higher than the above-specified upper limit (1500 W·min/m²) is applied to the aramid paper (A) in Comparative Example 2.

More specifically, commercially available aramid paper (such as Nomex® #410 supplied by DuPont, U.S.A.) with a thickness of 2 mil (50 μm) was employed in this embodiment. No low-temperature plasma treatment was applied to the surface of the aramid paper in Comparative Example 1. As a result, the compositional atomic ratio X (O/C) of the number of oxygen atoms to the number of carbon atoms on each film surface was substantially equal to the theoretical atomic ratio (100%). The treatment intensity of the low-temperature plasma treatment was set to 2050 W·min/m² in Comparative Example 2. Consequently, the surface compositional atomic ratio X (O/C) of the number of oxygen atoms (O) to the number of carbon atoms (C) was 253% of the theoretical atomic ratio. The lamination of the aramid paper (A) and the nonhydrolyzable resin film (B) is carried out in the same way as in Examples 1 to 5.

Tests were conducted on the aramid-PPS resin film laminates of Examples 1 to 5 and Comparative Examples 1 and 2 to examine interlayer adhesion (peel strength) and bending workability for verification of the appropriateness of the present invention. The test results are shown in Table 1.

(1) Interlayer Adhesion

A 90 degree peel force was measured at a tensile speed of 50 mm/min with respect to a sample with a width of 10 mm in accordance with Japanese Industrial Standards (JIS) C6481 using a tensile tester. A sample having a peel force ranging from 1 N/cm to 0.5 N/cm was determined to be more than a practical level and good in interlayer adhesion (Good). A sample having a peel force of 1 N/cm or more was determined to be particularly excellent in interlayer adhesion (Excellent). A sample having a peel force ranging from 0.5 N/cm to 0.2 N/cm was determined to be fair in interlayer adhesion (Fair). A sample having a peel force of 0.1 N/cm or less was determined to be poor in interlayer adhesion (Poor). Samples showing an interlayer adhesion of fair or higher are acceptable.

(2) Bending Workability

A sample which had been cut so as to have a width of 11 mm and a length of 30 cm was inserted into an automatic bending machine (supplied by the assignee of the present application) so as to be bent for evaluation of bending workability. The evaluation was visually made depending upon the presence or absence of appearance change such as pop-off or separation. A sample having no appearance change such as pop-off or separation was determined to be acceptable in bending workability (Good). A sample having an appearance change such as pop-off or separation even partially was determined to be unacceptable in bending workability (Poor) as a product.

TABLE 1

| | Aramid paper (A) | | | | Evaluation | |
|---|---|---|---|---|---|---|
| | Name | Plasma treatment intensity W · min/m² | O/C | Percentage to theoretical atomic ratio | Interlayer adhesion | Bending workability (appearance) |
| Comparative Example 1 | Nomex | — | 0.15 | 100 | Poor | Poor |
| Example 1 | Nomex | 50 | 0.19 | 127 | Fair | Good |
| Example 2 | Nomex | 130 | 0.27 | 174 | Good | Good |
| Example 3 | Nomex | 650 | 0.31 | 206 | Excellent | Good |
| Example 4 | Nomex | 1120 | 0.32 | 213 | Good | Good |
| Example 5 | Nomex | 1400 | 0.35 | 233 | Fair | Good |
| Comparative Example 2 | Nomex | 2050 | 0.38 | 253 | Poor | Poor |

As is demonstrated by the test results, all the aramid-PPS resin laminates containing aramid papers obtained from Examples 1 to 5 show good appearance after the bending working tests and have such bending workability as to have no problem in practical use. They also show superior interlayer adhesion.

In contrast, Comparative Example 1 whose aramid paper has not been subjected to a low-temperature plasma treatment shows no adhesion between the aramid paper and the PPS resin film. Comparative Example 2 does not show satisfactory interlayer adhesion, as the low-temperature plasma treatment was applied to the aramid paper at an intensity higher than 1500 W·min/m² to thereby render the compositional atomic ratio X (O/C) to be higher than 250% of the theoretical atomic ratio.

(3) Relation of Interlayer Adhesion with Bonding Temperature and Bonding Pressure Next, how the interlayer adhesion between the aramid paper and PPS resin film varies depending on the pressure and temperature of bonding was examined. The results are shown in Table 2.

TABLE 2

| | | Bonding pressure (kgf/cm²) | | | |
| --- | --- | --- | --- | --- | --- |
| | | 50 | 70 | 100 | 150 |
| Bonding temperature (° C.) | 100 | Poor | Poor | Poor | Good |
| | 120 | Poor | Fair | Good | Excellent |
| | 140 | Excellent | Excellent | Excellent | Excellent |
| | 160 | Excellent | Excellent | Excellent | Excellent |
| | 180 | Excellent | Excellent | Excellent | Excellent |
| | 200 | Excellent | Excellent | Excellent | Excellent |
| | 250 | Excellent | Excellent | Excellent | Excellent |

Bonding between the aramid paper and PPS resin film was performed at varying temperatures of 100° C., 120° C., 140° C., 160° C., 180° C., 200° C., and 250° C. and at varying pressures of 50 kgf/cm², 70 kgf/cm², 100 kgf/cm², and 150 kgf/cm², respectively, as given in Table 2. Bonding between the aramid paper and PPS resin film, both of which had been subjected to a plasma treatment, was performed at these bonding temperatures and bonding pressures, and how the interlayer adhesion varies was examined. The evaluation of the interlayer adhesion was performed according to the criteria as in Table 1. The bonding was performed at the set temperature and pressure for 3 minutes.

Data in Table 2 demonstrate that the interlayer adhesion increases with an elevating bonding temperature and with an increasing bonding pressure; and, in particular, good interlayer adhesion can be ensured even at a low bonding temperature of 100° C. when the bonding pressure is 150 kgf/cm². As is demonstrated above, the temperature of bonding between the aramid paper and PPS resin film can be lowered by increasing the bonding pressure. Typically, sufficient bonding strength between the aramid paper and PPS resin film can be exhibited even at a bonding temperature lower than 100° C. by setting the bonding pressure to higher than 150 kgf/cm². Accordingly, the temperature and pressure of bonding between the aramid paper and PPS resin film can be suitably set depending on a desired bonding strength (interlayer adhesion).

Another embodiment (plasma treatment+low temperature high pressure bonding) of the present invention, an aramid paper-PPS laminate is manufactured by subjecting an aramid paper and a PPS film to plasma surface treatment; laminating these members; and applying to them a pressure in terms of linear load of 500 kgf/cm or higher with a pair of press rolls at a roll temperature of 30° C. or higher but lower than 50° C., or applying to them a pressure in terms of linear load of 200 kgf/cm or higher with a pair of press rolls at a roll temperature of 50° C. or higher but lower than 100° C.

The aramid paper is called in detail as m-aramid paper which is also known under the trademark of Nomex® owned by E.l. du Pont de Nemours and Company, U.S.A, and made from aramid fibers and aramid pulp which are comprised of poly-meta-phenyleneisophthalamid (namely meta-aramid), or copolymer or mixed copolymer including the meta-aramid as a main component. Components to be copolymerized or mixed to the meta-aramid and the amount of the components are not limited particularly insofar as not losing characteristic properties of meta-aramid. For example, such components are at least one of terephthalic acid, p-phenylenediamine, hexamethylenediamine, cyclohexamethylenediamine and the like.

A product sold under the trade name of TORELINA® (trademark owned by of Toray Industries Inc.) is used as the PPS film.

The PPS has a melting point of about 285° C., and the aramid shows no clear melting point. The present inventors have found that the manufacturing method according to an embodiment of the present invention enables continuous lamination and bonding of an aramid paper and a PPS film to form a laminate through relatively low-temperature thermocompression bonding without using an adhesive, even at temperatures (30° C. or higher but lower than 100° C.) significantly lower than the melting point of the PPS. Specifically, the continuous lamination and bonding without using an adhesive is achieved by subjecting the aramid paper and the PPS film to a pretreatment (surface modification) with a low-temperature plasma treatment and applying to the laminate a pressure in terms of the predetermined linear load or higher with a pair of press rolls. A very thin interface layer of several nanometers thick is found between the aramid paper layer and the PPS film layer through microscopic observation.

This indicates that a surface layer of somewhat porous aramid paper is directly bonded with a surface layer of the PPS film. Though it has not yet been sufficiently clarified that the interface layer has what structure and has what function, this can be one of features of the adhesive-free aramid paper-PPS film laminate according to the present invention.

The thicknesses of the aramid paper and PPS film in the laminate are not especially limited. For example, when the laminate is used typically as a sheet-, tape-, or ribbon-form insulation material, the aramid paper practically has a thickness of from 30 to 150 μm, and the PPS film practically has a thickness of from 50 to 200 μm. Accordingly, the total thickness of the laminate, if having a two-layered structure of the aramid paper and the PPS film, is preferably from 80 to 350 μm; and the total thickness of the laminate, if having a three-layered structure of the aramid paper, the PPS film, and another ply of the aramid paper arranged in this order, is preferably from 110 to 500 μm.

In the aramid-PPS laminate, the temperature under the press rolls is preferably equal to or lower than the melting point of the PPS film (about 260° C. in filmed PPS). It has been verified that the manufacturing method according to the present invention enables lamination bonding (compression bonding) without using an adhesive even under conditions of temperatures (30° C. or higher but lower than 100° C.) significantly lower than the melting point of the PPS film, i.e., such low temperatures that are unexpected in common thermocompression bonding techniques. If the laminate has been heated at a temperature higher than the melting point, the PPS in the laminate recrystallizes during cooling, thereby loses its flexibility or becomes fragile. The resulting laminate thereby becomes less handleable and has insufficient characteristic properties. The laminate preferably has a three-layered structure including an aramid paper, a PPS film, and another ply of aramid paper arranged in this order, or a two-layered structure including an aramid paper and a PPS film. Specific examples of the PPS include TORELINA (registered trademark of Toray Industries, Inc.) supplied by Toray Industries, Inc.

The aramid paper is arranged on one or both sides of the laminate, and the PPS film is arranged as a core material of the laminate, because the aramid paper ensures satisfactory electrical insulation, chemical stability (chemical resistance), and heat resistance, while the PPS ensures not only satisfactory chemical stability and heat resistance but also superior electrical insulation and gas-liquid impermeability.

Electrical insulation materials composed of such adhesive-free aramid-PPS laminate are usable as insulation structures for electric rotating machines (e.g., a generator, motor, or generator-motor) which is used under severe conditions of temperatures, such as in an automotive engine room. Additionally, the adhesive-free aramid-PPS laminates help the resulting insulation materials to reduce the total thickness thereof, because they have no adhesive layer and the total thickness can thereby be reduced by the thickness of the adhesive layer. Typically, such an adhesive layer (adhesive agent) generally has a thickness of about fifty and several micrometers, and if a three-layered laminate including an aramid paper, a PPS film, and another ply of aramid paper further includes adhesive layers between the respective layers (in this case, the laminate has a total of five layers including two adhesive layers), the resulting laminate has a total thickness about hundred and several micrometers larger than that of original one without adhesive layers. With an increasing thickness thereof, an insulation material shows a decreasing heat dissipation. When the insulation material is used for insulation between a winding (coil) and an iron core, such an increasing thickness causes the coil to show a decreased heat dissipation, and this in turn causes a decreased output (power). The laminate according to the present invention, however, can have a reduced thickness because it does not require an adhesive, and the PPS film much excels in electrical insulation. These compounded factors contribute to the reduction of total thickness of the insulation material. This therefore provides an insulation structure that satisfies working conditions even under high-temperature conditions of around 180° C. and is optimal typically in electric rotating machine for use in vehicle, which electric rotating machine is required to be down-sized and to generate higher power even in a severe temperature environment such as in an engine room.

The press rolls are preferably composed of a rigid material having high rigidity. If using known-methods that a combination of a rubber roll and a metal roll has been used, the rubber roll deforms in its pressing face so that a sufficient pressing force is not applied to the laminate. When a pair of press rolls, such as metal rolls, made of rigid materials that are more rigid than the rubber rolls are used, a sufficient pressing force can be applied to the laminate.

In the method for manufacturing an adhesive-free aramid-PPS laminate, the press rolls preferably have a flexure compensation device of roll bending type, whereby control the magnitude of bending (namely flexure) of the rolls. Even if rigid press rolls, such as metal rolls, are used, the rolls may slightly deform in their pressing faces that sandwich the laminate. As a result, there are problems such as insufficient pressurizing force or a partially biased pressure to the laminate. In order to compensate or correct the bending (flexure) and to apply a sufficient pressurizing force, it is desirable to install the flexure compensation device of roll bending type. The flexure compensation device will be illustrated in detail later.

It is preferable that at least the press rolls are arranged in an atmosphere whose temperature is controllable. In order to keep a desired temperature of at least a device for pressing-laminating the laminate, a temperature control device equipped with a pre-heating zone and a slow cooling zone may be arranged. Although the lamination bonding may be performed at room temperature, it is preferable to keep the PPS film at a temperature higher than room temperature but lower than the melting point of the PPS so as to increase a bonding speed and sufficiently lower the pressurizing force.

In an apparatus for manufacturing the adhesive-free aramid-PPS laminate, the flexure compensation device of roll bending type is preferably arranged in a means whose temperature is controllable. In addition, the flexure compensation device of the roll bending type is preferably constituted to apply independent or different compensation amounts to right shaft and/or left shaft of the rolls.

In the present invention, the plasma surface treatment is a chemical plasma treatment using a direct current, alternating current, or high frequency, carried out in vacuum or various atmospheres, that include corona discharge (approximately in atmospheric pressure) and glow discharge (vacuum or under reduced pressure). According to the plasma surface treatment, the surfaces of the aramid paper and PPS film (also referred to as "PPS sheet") are modified to thereby form some types of functional groups such as COOH or OH groups in the surface of the aramid paper and PPS film. As a result of the surface modification it is possible to strongly bond the aramid paper and PPS film at a relatively low temperature of 30° C. or higher but lower than 100° C. This phenomenon is a very peculiar one and cannot be presumed from the description of the above-mentioned patent documents. Since the plasma treatment itself has been well known as a method of increasing bonding property of different resins, the detailed explanation on this technology is omitted. One example is that, when using an inner electrode type plasma treatment, it is preferable to have an intensity ranging from 30 w·min/m$^2$~1500 w·min/m$^2$.

Figure 2:
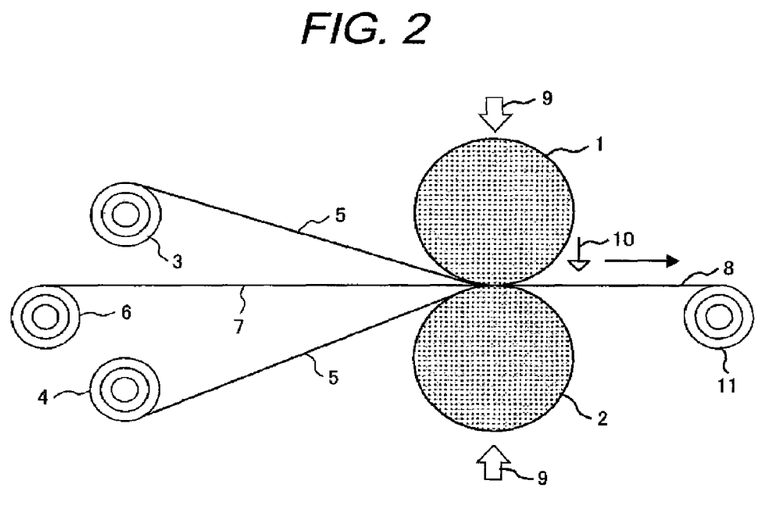
FIG. 2 is a schematic diagram of a laminating-bonding apparatus for use in a second embodiment of the present invention.

FIG. 2 is a schematic diagram of a compression-bonding apparatus for a laminate, for use in the above mentioned another embodiment (plasma treatment+low temperature/high pressure bonding). In the apparatus shown in FIG. 2, an aramid paper 5 is sent out from reels 3 and 4 for aramid paper, and a PPS film 7 is sent out from a reel 6 for PPS film, and they are fed between a pair of metal rolls 1 and 2, to be laminated in three layers (to form a sandwich structure). The laminate is pressurized and integrally bonded by the rolls without using an adhesive. The adhesive surface of the aramid paper 5 and both sides of the PPS film 7 have been subjected to surface treatment with plasma before lamination.

In order to detect and to compensate or control a pressure of the rolls, the apparatus further includes a pressing down device (roll pressure device) 9 with a controller. Though varying depending on the temperature conditions of the press rolls, the pressure is preferably set in terms of linear load of 500 kgf/cm or higher applied by a pair of press rolls at a temperature of 30° C. or higher but lower than 50° C.; or it is preferably set in terms of linear load of 200 kgf/cm or higher applied by a pair of press rolls at a temperature of 50° C. or higher but lower than 100° C. Rotating speed of the rolls are set by controlling the rotating speeds of the unwinding shafts and winding shaft so as to give a constant tension force to the film and paper at positions of back and forth of the rolls.

For a more accurate speed control, a transfer speed of the laminate by the rolls may be detected with a detector 10 and the detected speed may be feed-backed to the roll rotating speed. A transfer speed optimum for the manufacture of the laminate may vary depending on the pressure force and temperature. The higher the pressure force and higher the temperature, the higher the transfer speed becomes. At some transfer speeds, the preheating temperature or the roll temperature may be set to a temperature of 30° C. or higher but lower than 100° C. so as to raise the temperature of the material to an effective temperature by the action of the pre-heating or heat transferred from the rolls. The laminate 8 after laminating and bonding is wound as a product by the winding reel 11.

Conditions for the laminating-bonding apparatus using rolls are a homogeneous load over the width of the laminate and constant temperature in the surfaces of the rolls (in width and circumferential directions). In order to achieve the conditions, it is preferable to utilize rolls with high precision (e.g., high cylindricity, high circularity, and small deflection), the roll flexure compensation mechanism, and a surface temperature control mechanism (for example, the use of a heating medium circulating roll).

Figure 3:
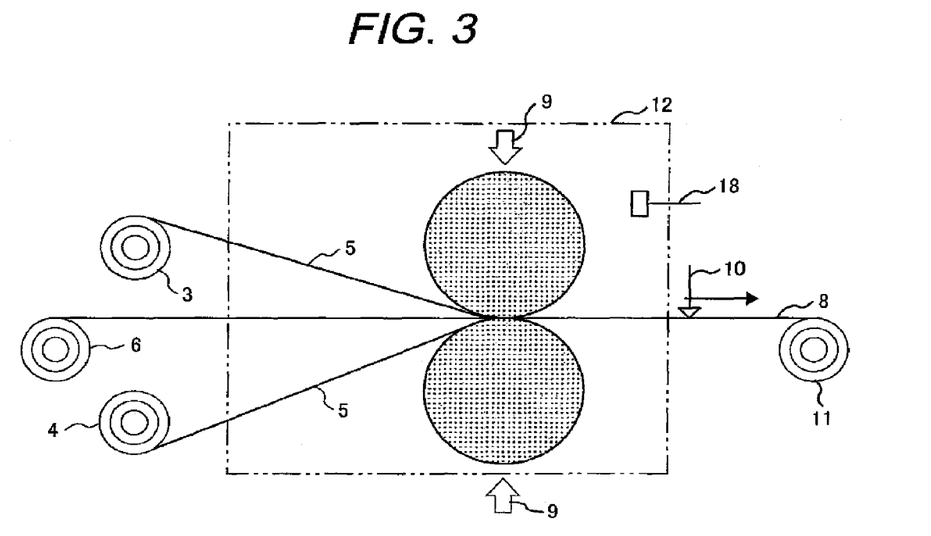
FIG. 3 is a schematic diagram of a laminating-bonding apparatus for use in a third embodiment of the present invention.

FIG. 3 shows a laminating-bonding apparatus for use in another embodiment, in which the same reference numerals as in FIG. 2 designate the same components. The embodiment in FIG. 3 differs from one in FIG. 2 in disposition of rolls that are arranged in a pre-heating and slow-cooling zone 12. According to this apparatus, the papers and film are pre-heated and slowly cooled so as to avoid quick heating and rapid cooling of the papers and film to thereby prevent wrinkles and other defects due to quick heating and rapid cooling of the papers and film. In addition, there may be a case where the papers and film cannot be heated sufficiently to heat them to a desired temperature by contacting them with the rolls because the contact time is short. The pre-heating and slow-cooling zone carries out pre-heating of them to compensate necessary heat to thereby increase productivity. A controller 18 for detecting temperature of the pre-heating and slow-cooling zone 12 is arranged. In FIGS. 2 and 3, the roll pressure device 9 is shown above the rolls for illustration, but the roll pressure device 9 is actually fixed to the supporting member of the roll shaft.

Figure 4:
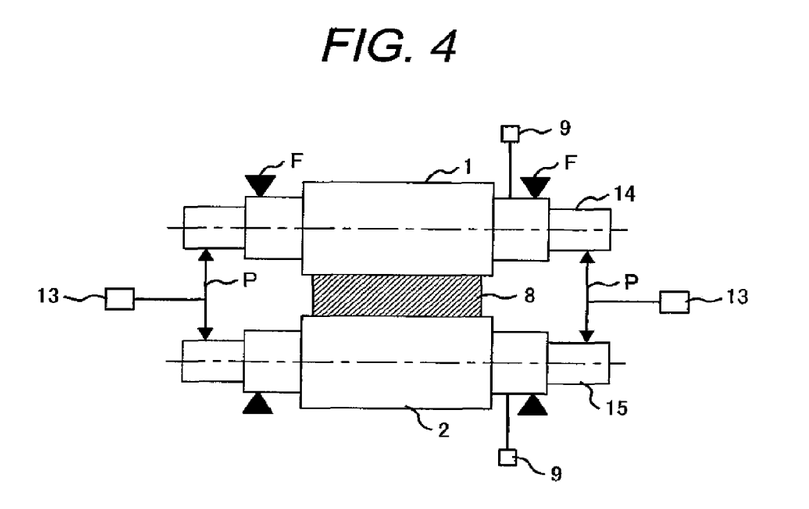
FIG. 4 is a schematic diagram illustrating roll-bending compensation in an embodiment of the present invention.
Figure 5:
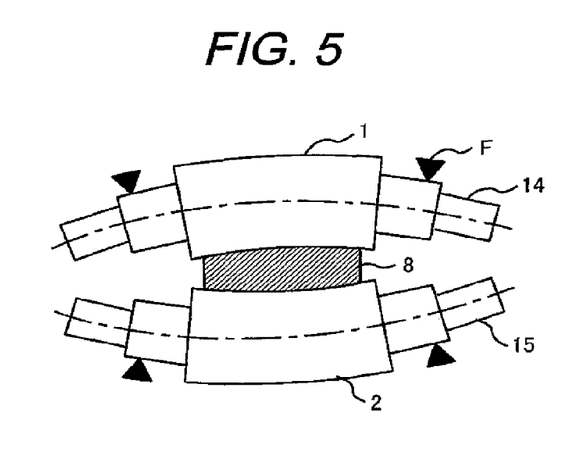
FIG. 5 is a diagram illustrating how rolls bend.

In the embodiment according to the present invention, a pair of rolls is preferably made of more rigid (high rigidity) iron-base materials, but, as shown in FIG. 5, an intermediate portion of the rolls may be bent during lamination and bonding so that a sufficient pressure force may not be given to the laminate or biased pressure force may be given to the laminate. In order to solve this problem, a roll flexure compensation mechanism 13 is provided in addition to the roll pressure device 9 to change or correct a roll profile within a short time. An example of this method is shown in FIG. 4. With reference to FIG. 4, a pressure force F is applied to shafts 14 and 15 of the rolls 1 and 2. Independently, a pressure P is applied to the shafts from an opposite direction of the pressure force F in order to prevent such a case where a constant and sufficient pressure force is not applied to the laminate 8 because the shafts 14 and 15 of the rolls 1 and 2 sandwich the laminate 8 to bend to be curved as shown in FIG. 4. This method is called a roll flexure compensation. The roll flexure compensation should preferably be done independently with respect to the right and left roll pressure devices.

Table 3 shows different conditions in the Examples (embodiments) 6-20 according to the present invention and Comparative Examples 3-5 and characteristic properties of laminates produced under the conditions. Aramid papers having thicknesses of 125 μm and PPS film having a thickness of 125 μm, each of which had been subjected to plasma surface treatment, were laminated and bonded with the apparatus shown in FIG. 3 to produce laminates of a three-layered sandwich structure of aramid paper-PPS film-aramid paper under the conditions given in Table 3.

The produced adhesive-free aramid-PPS laminates showed characteristic properties shown in the evaluations of bonding in Table 1.

The evaluations of bonding were performed at a "target bonding strength (peeling strength) in terms of cohesive failure strength of about 0.3 N/cm or higher". Under the conditions, a 180-degree peel test of each of the sample laminates was performed at a rate of 10 mm/min in an area of 10 mm wide and 150 mm long according to the method specified in Japanese Industrial Standards (JIS) K-6854-2. Samples that did not undergo peeling but undergo cohesive failure of the aramid paper (about 0.3 N/cm or higher) were evaluated as being accepted (good or excellent).

The evaluations of bonding demonstrate that, when the temperature of the rolls was set to 30° C., samples pressed under a linear load of the rolls of 500 kgf/cm or higher were evaluated as being "good", and those pressed under a linear load of the rolls of 700 kgf/cm or higher were evaluated as being "excellent". When the temperature of the rolls was set to 50° C., samples pressed under a linear load of the rolls of 200 kgf/cm or higher were evaluated as being "good", and those pressed under a linear load of the rolls of 300 kgf/cm or higher were evaluated as being "excellent". When the temperature of the rolls was set to 80° C. and 90° C., samples pressed under a linear load of the rolls of 200 kgf/cm or higher were evaluated as being "excellent". These results demonstrate that, with an elevating temperature of the rolls, lamination bonding without using an adhesive is enabled even under a lower linear load of the rolls.

Though varying depending on the roll temperature and linear load, the roll sending speed (a drawing speed of paper or film from a reel) may be determined according typically to the productivity and cost of the laminates. In the examples shown in Table 1, the sending speed of 0.5 m/min or more is preferred, and the rewinding speed of from 1 to 20 m/min is more preferred.

With reference to the evaluations of bonding of laminates, those showing particularly good bonding properties were laminated and bonded under proper transfer speeds (roll rewinding speeds) and proper linear loads at proper temperatures.

TABLE 3

| Material | 3 | 4 | 5 | 6 | 7 | 8 | 9 | 10 | 11 | 12 | 13 | 14 | 15 | 16 | 17 | 18 | 19 | 20 |
|---|---|---|---|---|---|---|---|---|---|---|---|---|---|---|---|---|---|---|
| | aramid paper-PPS-aramid paper (aramid paper: Nomex ® type #411, without calendering) | | | | | | | | | | | | | | | | | |
| Thickness of aramid paper before lamination (μm) | 125 | 125 | 125 | 125 | 125 | 125 | 125 | 125 | 125 | 125 | 125 | 125 | 125 | 125 | 125 | 125 | 125 | 125 |
| Thickness of PPS film before lamination (μm) | 125 | 125 | 125 | 125 | 125 | 125 | 125 | 125 | 125 | 125 | 125 | 125 | 125 | 125 | 125 | 125 | 125 | 125 |
| Roll temperature (° C.) | 30 | 30 | 30 | 30 | 30 | 30 | 50 | 50 | 50 | 50 | 50 | 50 | 80 | 80 | 80 | 95 | 95 | 95 |
| Laminate transfer speed (m/min.) | 1 | 1 | 1 | 1 | 1 | 1 | 1 | 1 | 1 | 1 | 1 | 1 | 1 | 1 | 1 | 1 | 1 | 1 |
| Roll linear load (kgf/cm) | 200 | 300 | 400 | 500 | 700 | 1000 | 200 | 300 | 400 | 500 | 700 | 1000 | 200 | 500 | 1000 | 200 | 500 | 1000 |
| Total thickness of laminate (μm) | 255 | 255 | 235 | 225 | 225 | 225 | 225 | 225 | 225 | 225 | 225 | 225 | 225 | 225 | 225 | 225 | 225 | 225 |
| Bonding evaluation | D | D | C | B | A | A | B | A | A | A | A | A | A | A | A | A | A | A |

Symbols D: easily peelable C: peelable B: good bonding A: excellent bonding

In Table 3, the roll temperatures of the press rolls are set forth from 30° C. to 95° C. As these temperatures are significantly lower than the melting point of the PPS, the fact that aramid paper and PPS film are firmly bonded with each other under these conditions would not have been expected. In this point, the present invention principally differs from the technologies disclosed in Patent Documents 1 to 3 in which bonding is conducted by melting polyesters.

Figure 7A:
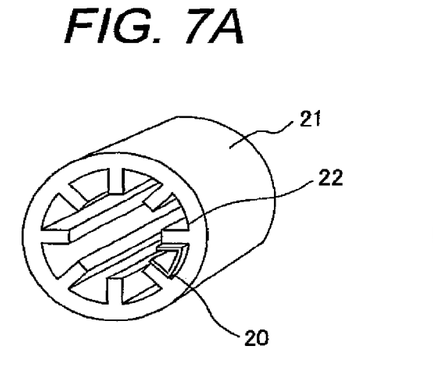
FIGS. 7A and 7B are perspective views illustrating how the insulation material is inserted into the slot in a stator of the rotating electric machinery.
Figure 7B:
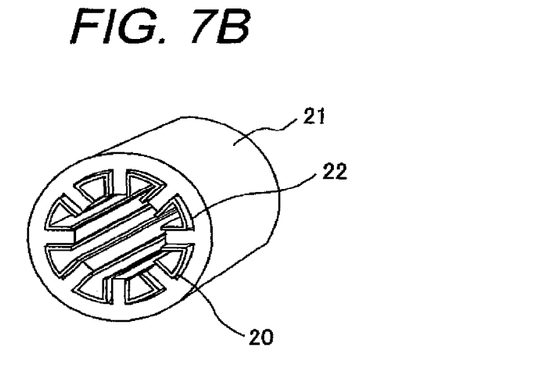
Figure 8:
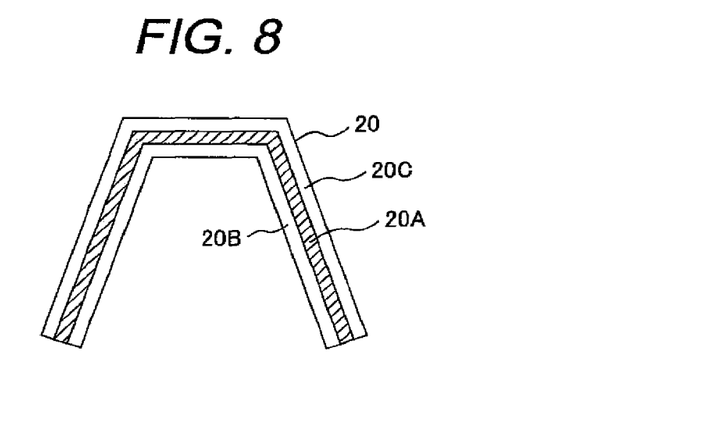
FIG. 8 is a cross-sectional view of the wedge-shaped insulation material.

Next, an embodiment in which an adhesive-free aramid-PPS laminate is used as an insulation material (insulation structure) for an electric rotating machine will be illustrated with reference to FIGS. 6 to 8.

Figure 6:
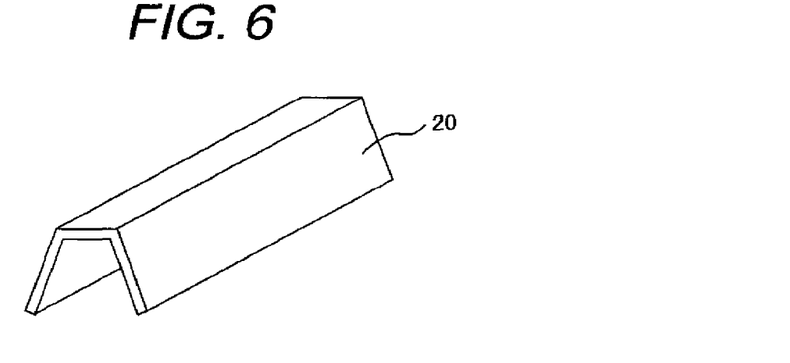
FIG. 6 is a perspective view of an insulation material having a wedge-shaped cross section, to be arranged in a slot of an iron core of rotating electric machinery.

FIG. 6 is a perspective view of an insulation material 20 having a wedge-shaped cross section to be mounted to slots of an iron core of electric rotating machine. FIGS. 7A and 7B are perspective views showing how the insulation material 20 is inserted into slots 22 provided in a stator 21 of the electric rotating machine. The slots 22 are illustrated herein in a simplified number for the sake of convenience upon drawing. In FIG. 7A, the insulation material 20 is inserted in only one of the slots 22; whereas, in FIG. 7B, the insulation material 20 is inserted in all the slots 22.

With reference to FIG. 6, the wedge-shaped insulation material 20 has a V-shaped cross section before being inserted into the slot 22, and it is inserted into the slot 22 through elastic deformation due to its flexibility so as to fit the inner shape of the slot 22. With reference to the cross-sectional view of FIG. 8, the wedge-shaped insulation material 20 is a three-layered laminate which includes an aramid paper 20C, a PPS film 20A, and another ply of aramid paper 20B arranged in this order from the slot surface, in which the aramid papers and the PPS film have been subjected to plasma surface treatment before lamination, and the aramid papers are each composed of an aramid fiber and an aramid pulp. These layers are laminated and bonded with each other through non-melting compression bonding without using an adhesive. The insulation material 20 is obtained by manufacturing the three-layer laminate (sheet) by the manufacturing method according to an embodiment of the present invention, in which the laminate includes an aramid paper, a PPS film, and another ply of aramid paper arranged in this order; and punching and bending the laminate. The insulation material after punching and bending is automatically inserted into a stator; thereafter a wire is inserted into the slots to form a coil; the resulting work is subjected to lacing; is fixed to an assembled stator by resin application and bonding; and thereby yields a stator as a finished piece.

This embodiment gives the following advantages particularly when being used as an insulation structure of a stator of electric rotating machine (a generator, a motor, or a generator-motor) to be used under severe high temperature conditions, as in an automotive engine room. Specifically, the insulation material as an adhesive-free aramid-PPS laminate can have a reduced thickness because it does not include an adhesive layer. Additionally, the PPS film (PPS layer) much excels in electrical insulation. These compounded factors contribute to the reduction of total thickness of the insulation material. This therefore provides an insulation structure that satisfies working conditions even under high-temperature conditions at around 180° C. and is optimal typically in vehicle electric rotating machine that is required to be down-sized and to generate higher power even in a severe temperature environment such as in an engine room. The insulation structure is effective not only for insulation in the slots but also for the insulation in other portions, such as connectors between coil ends in edges of the stator. Further, the insulation structure can also be widely applicable to the insulation material of other than the electric rotating machine. The insulation structure can also be a two-layered laminate having an aramid paper and a PPS film arranged in this order from the side facing the slot or be a laminate of four or more layers including aramid papers and PPS films, in which the aramid paper and PPS film have been subjected to plasma surface treatment.

As is described above, according to embodiments of the present invention, there are provided aramid-PPS laminates that show superior bonding without using an adhesive.

What is claimed is:

1. A method of manufacturing an adhesive-free laminate of an aramid paper and a polyphenylene sulfide film, comprising the following steps of:

providing the aramid paper made from aramid fibers and aramid pulp and subjected to a plasma surface treatment, wherein the aramid paper has a thickness of 30 to 150 μm, providing the polyphenylene sulfide film subjected to a plasma surface treatment, wherein the polyphenylene sulfide film has a thickness of 50 to 200 μm, and laminating and bonding the plasma surface treated aramid paper and the plasma surface treated polyphenylene sulfide film at a roll temperature of 30° C. or higher but lower than 50° C. under a linear load of 500 kgf/cm or higher with a pair of press rolls, or at a roll temperature of 50° C. or higher but lower than 100° C. under a linear load of 200 kgf/cm or higher with a pair of press rolls.

2. The method according to claim 1, further comprising a flexure compensation device configured to apply a pressure to shafts of the pair of press rolls from an opposite direction of the pressure of the linear load to prevent deviations from a constant and sufficient pressure force that might be caused by bending of the shafts of the pair of press rolls.

3. The method according to claim 2, wherein the laminate has a three-layered structure of the aramid paper, the polyphenylene sulfide film, and another ply of the aramid paper laminated in this order or has a two-layered structure of the aramid paper and the polyphenylene sulfide film.

4. The method according to claim 3, wherein the press rolls are made of a rigid material.

5. The method according to claim 3, wherein the press rolls are placed in an atmosphere whose temperature is controllable.

6. The method according to claim 2, wherein the press rolls are made of an iron-base material.

7. The method according to claim 1, wherein the laminate has a three-layered structure of the aramid paper, the polyphenylene sulfide film, and another ply of the aramid paper laminated in this order or has a two-layered structure of the aramid paper and the polyphenylene sulfide film.

8. The method according to claim 7, wherein the press rolls have a flexure compensation device of roll bending type, to thereby compensate the flexure of the rolls.

9. The method according to claim 8, wherein the press rolls are made of an iron-base material.

10. The method according to claim 7, wherein the press rolls are made of a rigid material.

11. The method according to claim 7, wherein the press rolls are placed in an atmosphere whose temperature is controllable.

* * * * *